United States Patent [19]

Rybak

[11] 3,739,525
[45] June 19, 1973

[54] PLANT SUPPORT DEVICE
[75] Inventor: Richard A. Rybak, Dunedin, Fla.
[73] Assignee: The Hansen Manufacturing Company, Cleveland, Ohio
[22] Filed: Jan. 3, 1972
[21] Appl. No.: 214,775

[52] U.S. Cl............ 47/44, 24/248 SL, 24/249 PP, 24/255 SL
[51] Int. Cl............................................ A01g 17/14
[58] Field of Search ............... 24/248 SL, 255 SL, 24/249 PR, 81 CC; 47/44–47

[56] References Cited
UNITED STATES PATENTS

| | | | |
|---|---|---|---|
| 2,818,871 | 1/1958 | Beaudry | 24/255 SL |
| 3,494,072 | 2/1970 | Olson | 47/44 |
| 2,718,042 | 9/1955 | Hokanson | 24/259 A X |
| 3,461,876 | 8/1969 | Miller | 24/255 SL |
| 3,323,208 | 6/1967 | Hurley | 24/255 SL |
| 3,518,791 | 7/1970 | Carson et al | 47/47 |

Primary Examiner—Robert E. Bagwill
Attorney—J. Herman Yount, Jr. and Calvin G. Covell

[57] ABSTRACT

An improved plant support device or clip is adapted to be utilized with an upright support strand of wire or twine. The clip includes a pair of arcuate arms which are closed to encircle the stem of the plant. As the arms are closed, the support strand is gripped by a clamp which holds the clip against movement along the strand. The clamp has gripping surfaces with offset elongated clamp ribs which securely grip the strand. A retaining rib extends transversely to the clamp ribs to prevent the strand from moving along the clamp ribs and becoming disengaged from the clamp. The arms of the clip are held in the closed position by a latch which can be readily released by resiliently deforming one of the clip arms.

7 Claims, 8 Drawing Figures

PATENTED JUN 19 1973 3,739,525

PLANT SUPPORT DEVICE

This invention relates to a new and improved plant support device and more particularly to a clip which cooperates with a support element to hold a plant in a desired position.

Upright strands of wire or twine are commonly used to retain the stalks or stems of small plants, such as tomato plants, in an upright position. Although the plant stems can be tied to the upright support strand, the supporting of plants has been facilitated by the use of clips, such as the one shown in U.S. Pat. No. 3,494,072. Although several known types of plant support clips have greatly facilitated the connecting of plant stems with a support strand, these clips have not, for one reason or another, been entirely satisfactory in their operation. Specifically, with certain known plant clips difficulty is encountered in anchoring the clips to the support strand. With other known plant clips, difficulty is encountered in opening the plant clips to move them along the support strand as the plants grow.

Accordingly, it is an object of this invention to provide a new and improved support device or clip for use in retaining a plant in a desired positional relationship with a support strand and wherein the clip includes a clamp having elongated ribs for preventing relative movement between the support strand and the clip.

Another object of this invention is to provide a new and improved support device or clip for retaining a plant in a desired positional relationship with a strand of material and wherein the clip includes a clamp having first and second sets of ribs which are offset relative to each other along the strand of material so that the ribs clampingly engage the strand of material at axially spaced apart locations to prevent relative movement between the clip and the strand.

Another object of this invention is to provide a new and improved support device or clip which retains a plant in a desired positional relationship with a support element and includes a pair of arcuately bowed arms which are held in a closed position encircling a stem or stalk of the plant by a latch and wherein the latch can be readily released by merely pressing inwardly against one of the arms.

These and other objects and features of the present invention will become more apparent on a reading of the following description taken in connection with the accompanying drawings wherein.

Figure 2:
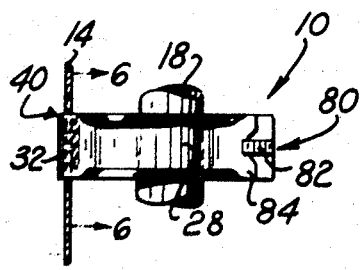
FIG. 2 is an enlarged view of the area designated 2—2 in FIG. 1 and illustrating the relationship of the support clip to the strand and the stem of the plant.
Figure 1:
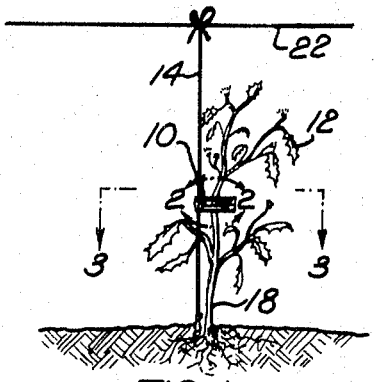
FIG. 1 is an illustration of a plant support clip constructed in accordance with the present invention and depicting the supporting of a plant with the clip and an upright support strand.

A plant support clip or device 10 constructed in accordance with the present invention is illustrated in FIG. 1 in association with a small plant 12. The clip 10 grips an upright support strand 14 of wire or twine (FIG. 2) and encircles a stem or stalk 18 of the plant 12 (FIG. 3) to hold the plant in a generally upright position. In accordance with common practice, the support strand 14 is connected with a generally horizontal main length of wire or twine 22 which extends along a row of plants.

Figure 3:
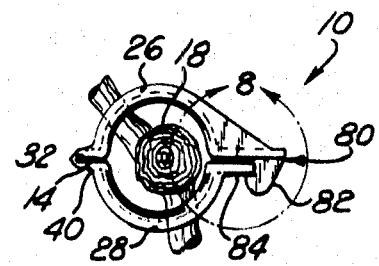
FIG. 3 is an enlarged plan view, taken generally along a line 3—3 of FIG. 1, further illustrating the relationship between the upright strand, clip, and plant stem.
Figure 4:
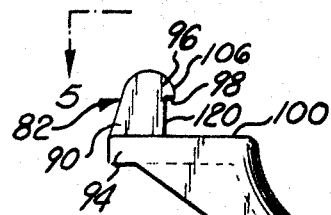
FIG. 4 is an enlarged side view of the plant support clip in a fully open position.

The plant support clip 10 is integrally molded of a resilient polymeric material with arcuately bowed clamp arms 26 and 28 in the fully open position of FIG. 4. The clamp arms 26 and 28 are interconnected by a resiliently deflectable hinge 32. When the arms 26 and 28 are moved from the open position of FIG. 4 to encircle the stalk 18 of a plant, the hinge 32 is resiliently bent about its central axis 34. As the arms are moved toward the closed position of FIGS. 2 and 3, a clamp 40 grips the strand 14 (FIGS. 6 and 7) between a pair of clamp flanges 44 and 46 having generally planar clamp surfaces 48 and 50. A set of clamp ribs 54 on the clamp flange 44 cooperates with a set of clamp ribs 58 on the clamp flange 46 to firmly grip the strand 14.

Figure 6:
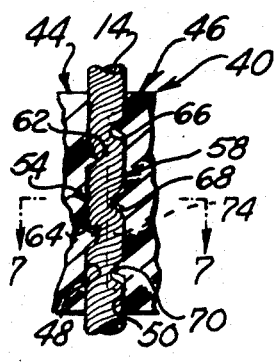
FIG. 6 is an enlarged fragmentary sectional view, taken generally along the line 6—6 of FIG. 2, illustrating the relationship between a clamp portion of the support clip and the upright support strand when the clip is in the closed position of FIG. 3.
Figure 7:
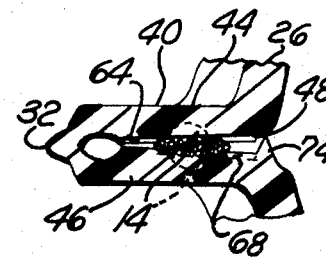
FIG. 7 is an enlarged fragmentary sectional view, taken generally along the line 7—7 of FIG. 6, illustrating how the clamp portion of the clip grips the upright support strand.

To securely anchor the clip 10 on the strand 14, the two sets of ribs 54 and 58 are offset relative to each other so that the support strand 14 is deformed along a torturous or winding path (see FIG. 6). Thus, parallel clamp ribs 62 and 64 extend perpendicular to the hinge axis 34 and are offset along this axis relative to opposing parallel clamp ribs 66, 68 and 70. The gripping action provided by the offset clamp ribs 62 to 70 is particularly advantageous when the support strand 14 is made of wire.

When the clip 10 is in the closed position, it is necessary to prevent the support strand 14 from moving along the clamp ribs 62 to 70 and becoming disengaged from the clamp 40. Accordingly, the support strand 14 is retained or trapped between the hinge 32 and a retaining rib 74 which extends perpendicular to the clamp ribs 66, 68 and 70. The retaining rib 74 advantageously projects further outwardly from the clamp surface 50 (see FIG. 4) than do the ribs 66, 68 and 70 so that the retaining rib cooperates with the clamp ribs 62 and 64 to entrap the strand 14.

The arms 26 and 28 are held in the closed position of FIG. 3 by a latch 80. The latch 80 includes a catch 82 which is connected with the arm 26 and engages a latch flange 84 connected with the arm 28. The catch 82 engages the flange 84 to hold the arms 26 and 28 in the closed position. The catch 82 has a shank 90 (FIG. 4) which is integrally formed with and extends outwardly from a flange 94. A nose portion 96 projects from the shank 90 toward the arcuately bowed arm 26 and has a latch surface 98 which extends parallel to a surface 100 of the flange 94. The latch surface 98 engages a retaining surface 102 on the latch flange 84 to hold the clip arms 26 and 28 in the closed position (see FIG. 8).

Figure 5:
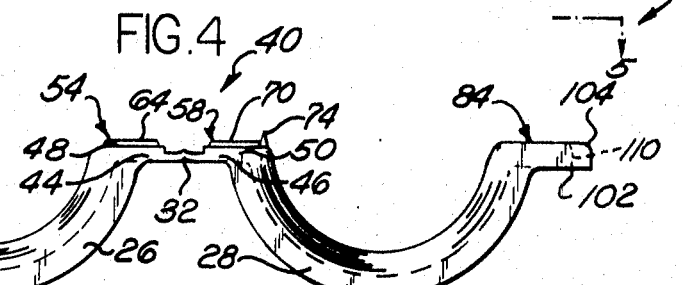
FIG. 5 is a plan view, taken generally along the line 5—5 of FIG. 4, illustrating the relationship between arcuately bowed arms, hinge, clamp, and latch portions of the support clip when it is in the fully open position.
Figure 5:
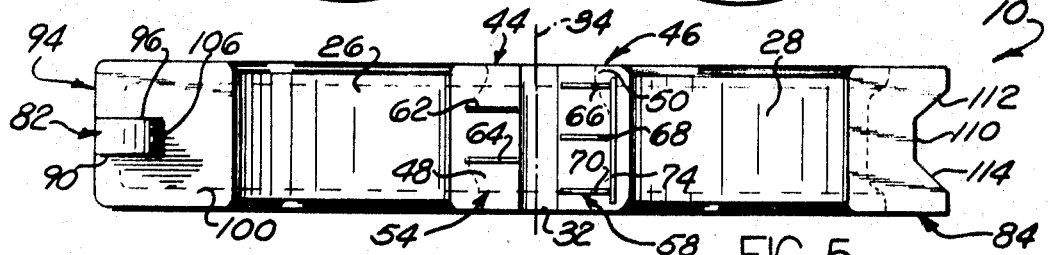

When the arms 26 and 28 move from the open position of FIG. 4 toward the closed position of FIG. 3, an outer end portion 104 of the latch flange 84 (see FIGS. 4 and 5) is moved into engagement with an arcuate cam surface 106 on the nose portion 96. If the arms 26 and 28 are properly aligned with each other, the cam surface 106 is engaged by a follower surface 110 on the end portion 104 of the latch flange 84 (see FIG. 5). However, if the arms 26 and 28 are slightly skewed relative to each other, one of a pair of inwardly sloping cam or guide surfaces 112 or 114 will engage the nose 96 and tend to force or cam the arms 26 and 28 into alignment with each other. Once the arms 26 and 28 have been aligned, the surface 110 slides along the cam surface 106 on the nose 96 toward the flange 94.

Figure 8:
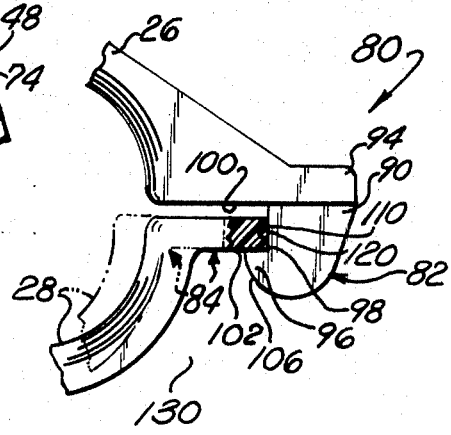
FIG. 8 is an enlarged fragmentary view of the area designated 8—8 in FIG. 3 and illustrating a latch assembly for holding the clip arms in the closed position.

As the surface 110 slides along the cam surface 106 on the nose 96, the arm 28 is resiliently deformed inwardly, toward the position shown in dashed lines in FIG. 8. This movement of the latch flange 84 decreases the arc of curvature of the arcuately bowed arm 28 to enable the latch flange 84 to pass under the nose 96 of the catch 82. When this happens, the natural resilience of the arm 28 causes the arm to return to its initial configuration, shown in solid lines in FIG. 8, so that the surface 110 on the end portion 104 moves into abutting engagement with a stop surface 120 on the shank 90 of the catch 82 (FIG. 8). The natural resilience of the hinge 32 then presses the retaining surface 102 on the latch flange 84 into abutting engagement with the latch surface 98 on the nose 96.

When the latch 80 is engaged, the arms 26 and 28 are held in the closed position of FIG. 3 encircling the stem 18 of the plant 12. As the plant 12 grows, it is necessary to move the clip 10 upwardly along the strand 14 in order to properly support the plant. However, when the clip 10 is in the closed position of FIG. 3, the clamp 40 securely holds the clip against axial movement along the support strand 14. Therefore, the clip 10 must be periodically opened and the clamp 40 released so that the clip can be moved vertically along the support strand 14 to properly position the clip 10 as the plant 12 grows.

To facilitate repositioning of the support clip 10, the clip can be opened with one hand by merely pressing inwardly with a forefinger against the resilient arm 28, in the manner indicated by the arrow 130 in FIG. 8. Simultaneously therewith, the catch 82 is pressed outwardly with the end of the forefinger. This causes the arc of curvature of the arm 28 to decrease to move the latch flange 84 inwardly from the position shown in solid lines in FIG. 8 to the position shown in dashed lines. Of course, this moves the latch flange 84 out from under the nose portion 96 of the catch 82 so that the arms 26 and 28 can be moved apart under the influence of the resiliently deformed hinge 32.

In view of the foregoing description, it can be seen that the support clip 10 includes a pair of arms 26 and 28 which are pivotally interconnected by the hinge 32. When the arms are pivoted from the open position of FIG. 4 toward the closed position of FIG. 3, the clamp 40 is closed on the support strand 14 to hold the clip against movement relative to the support strand. The arms 26 and 28 are held in the closed position by the latch 80.

The clamp 40 is advantageously provided with a pair of opposed clamping surfaces 48 and 50 from which elongated clamp ribs 62 to 70 extend. The ribs on one of the clamp surfaces are offset relative to the ribs on the other clamp surface so that each of the ribs engages the strand 14 at an axially offset or spaced apart location from the other ribs. A retaining rib 74 is advantageously provided to prevent the strand 14 from being pulled out of the clamp 40.

Whenever it is necessary to move the clip 10 along the strand 14, the clip can be readily opened by pressing inwardly against arm 28 to move the latch flange 84 away from the catch 82. When the latch flange 84 has cleared the nose 96 of the catch 82, the inherent resiliency of the hinge 32 will cause the arms 26 and 28 to move apart. Although the clip 10 has been illustrated herein in association with a support strand 14 of wire or twine, it is contemplated that the clip could be utilized with a support stake. If this was done, the clip would encircle both the stake and the stem 18 of a plant which is to be supported.

I claim:

1. A support device for use in retaining a plant in a desired positional relationship with a support strand of material, said support device comprising a pair of arms movable between an open position and a closed position encircling a portion of the plant, hinge means operatively interconnecting said arms for enabling said arms to move between the open and closed positions, latch means connected with said arms for releasably retaining said arms in the closed position, and clamp means connected with said arms for holding said support device against movement along the strand of material when said arms are in the closed position, said clamp means including a pair of opposed clamp surfaces for grippingly engaging opposite sides of the strand of material when said arms are in the closed position and elongated rib means protruding from at least one of said clamp surfaces for retaining the strand of material against movement relative to said clamp surfaces when said arms are in the closed position, said rib means including a first set of parallel spaced apart ribs extending transversely to the longitudinal axis of the strand of material and from one of said clamp surfaces toward the other of said clamp surfaces, a second set of parallel spaced apart ribs extending transversely to the longitudinal axis of the strand of material and protruding from the other of said clamp surfaces toward the one clamp surface, each of the ribs of said first set of ribs being offset axially along the strand of material relative to each of the ribs of said second set of ribs to engage the strand of material at axially spaced apart locations along the strand of material, and a retaining rib protruding from said one clamp surface toward said other clamp surface and extending transversely to said first set of ribs to retain the strand of material against movement relative to said clamp surfaces in a direction extending transversely to the longitudinal axis of the strand of material, said retaining rib being disposed adjacent to one end portion of said clamp surfaces opposite from said one end portion with the strand of material entrapped between said hinge means and said retaining rib when said arms are in the closed position.

2. A support device as set forth in claim 1 wherein said retaining rib protrudes from said one clamp surface toward the other clamp surface to a greater extent than said first set of ribs to further promote entrapment of the strand of material between said hinge means and said retaining rib when said arms are in the closed position.

3. A support device as set forth in claim 1 wherein one of said arms has an arcuate bowed portion formed of a resiliently deflectable material, said latch means including a retaining surface connected with said one arm and a catch connected with the other arm for engaging said retaining surface when said latch means is retaining said arms in the closed position, said arcuate bowed portion of said one arm being resiliently deformable from a first curvature in which said retaining surface is engaged by said catch to a second curvature in which said retaining surface is spaced from said catch to release said arms for movement from the closed position to the open position.

4. A support device as set forth in claim 3 wherein said catch includes a latch surface and said hinge means includes means for urging said retaining and latch surfaces into abutting engagement when said latch means is retaining said arms against movement relative to each other.

5. A support device as set forth in claim 4 further including cam means for positioning said retaining and latch surfaces in a predetermined orientation relative to each other upon operation of said arms from the open position to the closed position.

6. A support device as set forth in claim 1 wherein said arms, hinge means, latch means and clamp means are integrally molded with said hinge means and clamp means disposed intermediate said arms.

7. A support device as set forth in claim 1 wherein said clamp means includes an elongated rib having a longitudinal axis extending generally parallel to a longitudinal axis of said support element when said arms are in the closed position.

* * * * *